United States Patent [19]

Becker

[11] Patent Number: 5,487,081
[45] Date of Patent: Jan. 23, 1996

[54] PROCESS AND APPARATUS FOR THE TREATMENT OF THE WASTE GASES OF AN ARC FURNACE

[75] Inventor: Heinrich Becker, Düsseldorf, Germany

[73] Assignee: Mannesmann Aktiengesellschaft, Dusseldorf, Germany

[21] Appl. No.: 35,353

[22] Filed: Mar. 22, 1993

[30] Foreign Application Priority Data

Mar. 23, 1992 [DE] Germany .......................... 42 09 765.7

[51] Int. Cl.⁶ ...................................... F27D 17/00
[52] U.S. Cl. ................... 373/9; 373/80; 75/10.36; 266/144
[58] Field of Search ............... 373/8, 9, 77, 80, 373/81, 18, 2; 75/10.28, 10.29, 10.36; 266/156, 186, 144

[56] References Cited

U.S. PATENT DOCUMENTS

| | | | |
|---|---|---|---|
| 3,164,658 | 1/1965 | Yagi | 373/9 |
| 3,379,425 | 4/1968 | Dell'Agnese et al. | 373/80 |
| 3,441,651 | 4/1969 | Viens et al. | 373/80 |
| 4,205,830 | 6/1980 | Beggs et al. | 266/156 |
| 4,477,910 | 10/1984 | Nijhawan et al. | 373/9 |
| 4,790,516 | 12/1988 | Sugiura et al. | 266/144 |
| 4,995,051 | 2/1991 | Hakulin et al. | 373/81 |
| 5,004,496 | 4/1991 | Aune et al. | 75/10.28 |
| 5,264,020 | 11/1993 | Ehle et al. | 373/80 |

FOREIGN PATENT DOCUMENTS 1928501  3/1972  Germany .
3827086  2/1990  Germany .

Primary Examiner—Tu Hoang
Attorney, Agent, or Firm—Cohen, Pontani, Lieberman, Pavane

[57] ABSTRACT

A process is provided for the treatment of waste gases, dust and vapor from a closed arc furnace disposed in a furnace vessel. The furnace vessel contains a charge column, a metal melt and slag arranged in the lower portion of that vessel. The charge column, the metal melt and the slag are smelted in the furnace vessel. The gases, dust and vapors are guided in a direction opposite to the natural flow through the charge column in the furnace during the smelting. The gases, dust and vapor are then brought into contact with the melt and the slag after leaving the charge column. The gases, dust and vapors are then removed from the arc furnace in a region between the upper and lower portions of the vessel.

21 Claims, 3 Drawing Sheets

5,487,081

PROCESS AND APPARATUS FOR THE TREATMENT OF THE WASTE GASES OF AN ARC FURNACE

FIELD OF THE INVENTION

The invention is directed to a an apparatus and process for the treatment of the exhaust or waste gases from a closed arc furnace.

BACKGROUND OF THE INVENTION

Smelting furnaces are regularly provided with exhaust devices to reduce toxic emission and environmental loading. For example, an arc furnace is known from DE-AS 19 28 501 in which an exhaust line is provided at the furnace cover. The exhaust line has adjusting and throttle devices by which the exhaust device can be adjusted in accordance with the operating processes in the arc furnace, i.e. smelting, refining, alloying, and de-slagging. A portion of the flue gases occurring in the furnace flows through the burden or charge column in accordance with the thermal currents and is sucked out below the cover at a nominal negative pressure.

If scrap containing not only so-called solid or high-grade melting scrap but also an abundance of impurities, e.g. in the form of varnish, plastics, oils and grease, is melted in such an arc furnace these materials may reach the exhaust device as gas, vapor or dust. Costly after-treatment devices such as after-burning chambers with external heating, dust processing and dust detoxification systems are provided before it is possible to emit to the atmosphere the exhaust gases which are to be cleaned in a filter system. These after-treatment devices require a significant expenditure of energy and are thus uneconomical to operate.

A process and a device for thermal decontamination of filter dusts and other residual substances is known from DE-OS 38 27 086 in which the material is introduced into an induction heated crucible furnace for removing possible contents of dioxins and furans and for preventing a possible leaching of heavy metals contained therein. The dust is melted in this crucible furnace at temperatures of 1400 to 1600 degrees Celsius and the liquid phase is removed and quenched in a water bath. The forming gas phase is simultaneously guided along a high-temperature section of at least 1200 degrees Celsius and the exhaust gas is then shock-cooled via a spray cooler. In this process, the solids are separated off in a subsequently connected high-power dust separator. This process in addition to being costly has a disadvantage of first producing toxic dust prior to treatment.

OBJECT OF THE INVENTION

An object of the invention is to provide a process and an apparatus in which environmentally harmful toxic substances, particularly dioxins and furans, are eliminated in a one-step process using simple means while avoiding unpleasant odors.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

SUMMARY OF THE INVENTION

In accordance with an aspect of the present invention, the gases, dusts and vapors found in the furnace vessel during the melting process are guided opposite their natural thermal flow direction through the charge found in an arc furnace, the normal flow direction being vertical. The gases, dust and vapors are brought into contact with the melt and then sucked out in the region between the upper and lower vessel of the arc furnace. The flue gases are exposed to a temperature of approximately 1600 degrees Celsius through contact with the melt. In so doing, the dioxins and furans are destroyed, since hydrocarbon and organic pollutants are broken down into individual elements immediately and completely. Moreover, the molten steel releases oxygen aggressively so that possible admixtures of the flue gases are reduced. Elements which are not dissolved in the steel and are also not oxidized pass into the gaseous phase at these high temperatures. The detoxified exhaust gases can be purified relatively easily with suitable filter systems.

In the overwhelming majority of cases, scrap is melted in the arc furnaces. Toward the end of the smelting process when all of the harmful substances accompanying the scrap have been burned, the flue gases are sucked off via the furnace cover, i.e. the exhaust is switched from the lower portion of the vessel to the furnace cover.

In an advantageous development, the volume of the upper portion of the vessel permits at least a two-basket charging of scrap, i.e. twice a normal amount. This is advantageous in that the melting process is less frequently impeded by the charging process. Also, the enlarged furnace vessel is now available as a combustion chamber for after-burning of CO to $CO_2$, which is particularly important e.g. in furnace operation with foaming slag.

It is further suggested to provide auxiliary burners at the upper portion of the vessel through which fossil fuels in particular can be introduced.

The guidance of the gas from top to bottom through the scrap column causes a more uniform temperature profile inside the smelting unit, which is further increased by the energy introduced by means of the auxiliary burners for heating the scrap outside the burner region.

The treatment of the gases, vapors and dusts is effected with a low energy requirement, since only the pressure losses of the scrap column and the reversal of the natural thermal currents need be produced by additional blowing output. In so doing, the quantity of feed air is sucked in the region of the cover seal between the upper part of the vessel and the cover. The pressure in the furnace head on port end which is determined by a pressure gauge is used for regulating the gas quantity.

A special variant of the process consists in that additional gases originating from independent gas suppliers are to be introduced into the furnace head. These may be gases which are already loaded with toxic materials.

The majority of the dust occurring in the furnace is retained in the arc furnace solely by the scrap column and, along with the scrap, enters the liquid phase in which a thermal decontamination takes place.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
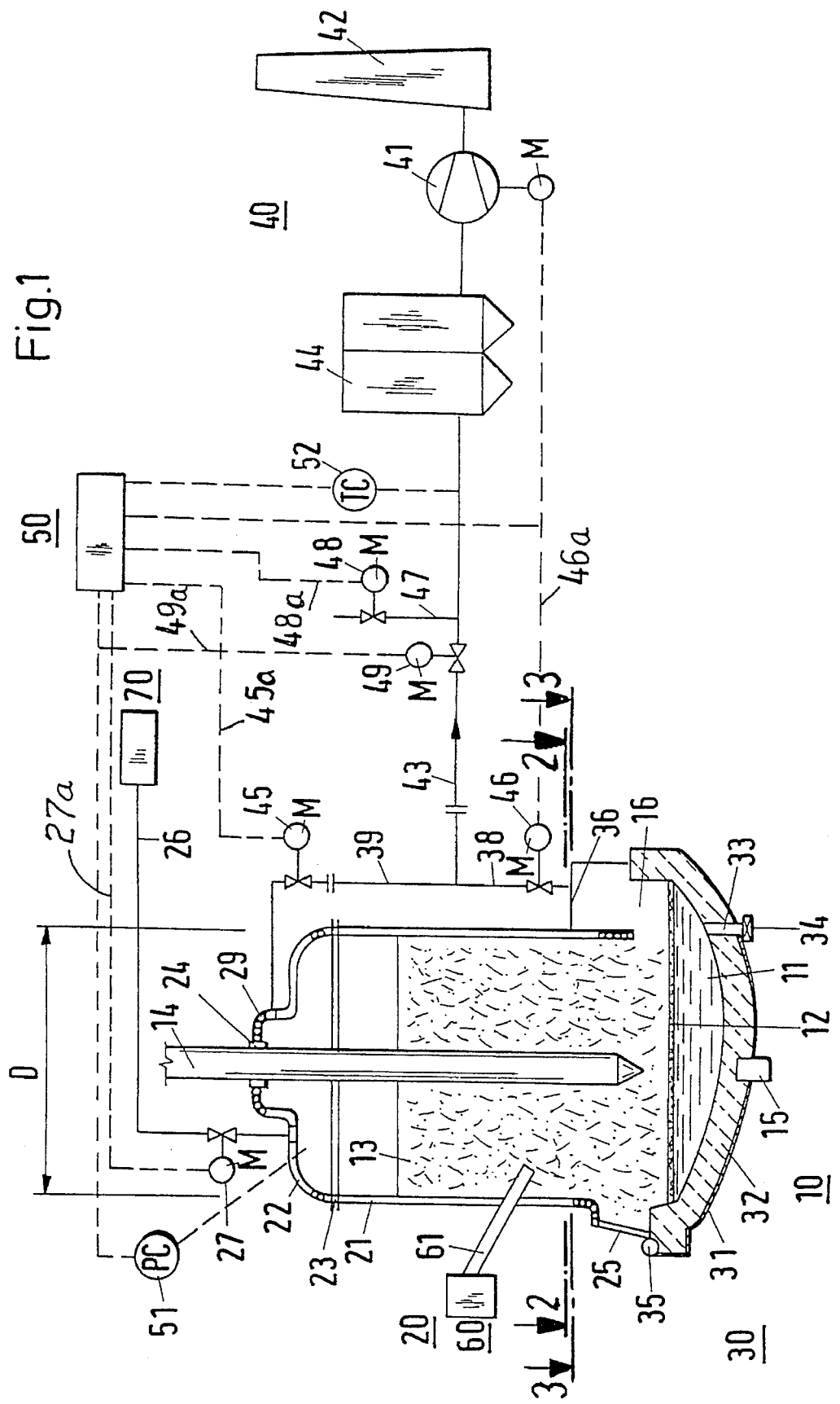
FIG. 1 is a diagram of an arc furnace including a suction device.

FIG. 1 shows the furnace vessel 10 of the arc furnace including an upper portion 20 of the vessel 10 and a lower portion 30 of the vessel 10. The melt 11 on which the slag 12 floats and on which the charge column 13 rests is situated in the furnace vessel.

The upper portion 20 of the vessel has a cooling jacket 21 in which a charging door 25 is arranged in the lower region. The opening of the upper portion of the vessel is closed by a cover 22. The cover 22 has a cover seal 23 facing the vessel and an electrode seal 24 in its center. At least one electrode 14 projecting into the vessel 10 is provided through the center of the cover which is constructed as a dome 29. A gas feed line 26, in which an adjusting and throttle device 27 is arranged, is provided at the cover. The adjusting and throttle device 27 communicates with the measuring and regulating device 50 via means which are known in the measuring art. The gas feed line 26 is connected to a known gas supply installation 70, and therefore no detail needs to be provided. As a result of the gas feed line 26, it is possible to treat gases charged with toxic substances in the furnace vessel in a directed manner according to the suggested process.

Further, a feed device having a secondary energy source 60 is arranged in the region of the upper portion 20 of the vessel and has burners 61 which project into the interior of the furnace substantially in a radial direction through the cooling jacket 21.

The lower portion 30 of the vessel substantially includes a metallic casing or jacket 31 which is outfitted with a fireproof or refractory lining 32. A bottom tap opening or discharge aperture 33 which can be closed by a locking device 34 is provided in the lower portion 30 of the vessel.

In a dc furnace, at least one anode 15 is provided in the lower portion 30 of the vessel. A slag hole 35 is arranged at the edge of the lower portion 30 of the vessel. The lower portion 30 of the vessel projects beyond the upper portion 20 of the vessel and the projecting part forms a duct 16 which is enclosed by a covering 36.

A connection line 38, which is combined with a connection line 39 connected to the cover 22 to form a connecting line 43, is provided at the duct covering 36. The connecting line 43 is part of an exhaust device 40 which includes a filter 44, a chimney 42, and a blower 41 arranged between the latter. A feed-air line 47 is provided in the flow direction prior to the filter 44. The individual lines 26, 38, 39, 43 and 47 are adjustable with respect to gas quantity by means of the adjusting and throttle devices 27, 45, 46, 48 and 49 which are connected with a measuring and regulating device 50 via lines 27a, 45a, 46a, 48a and 49a.

In addition, the measuring and regulating device 50 has a pressure gauge 51 arranged in the region of the cover 22 and temperature gauge 52 arranged directly in front of the filter 44.

Figure 2:
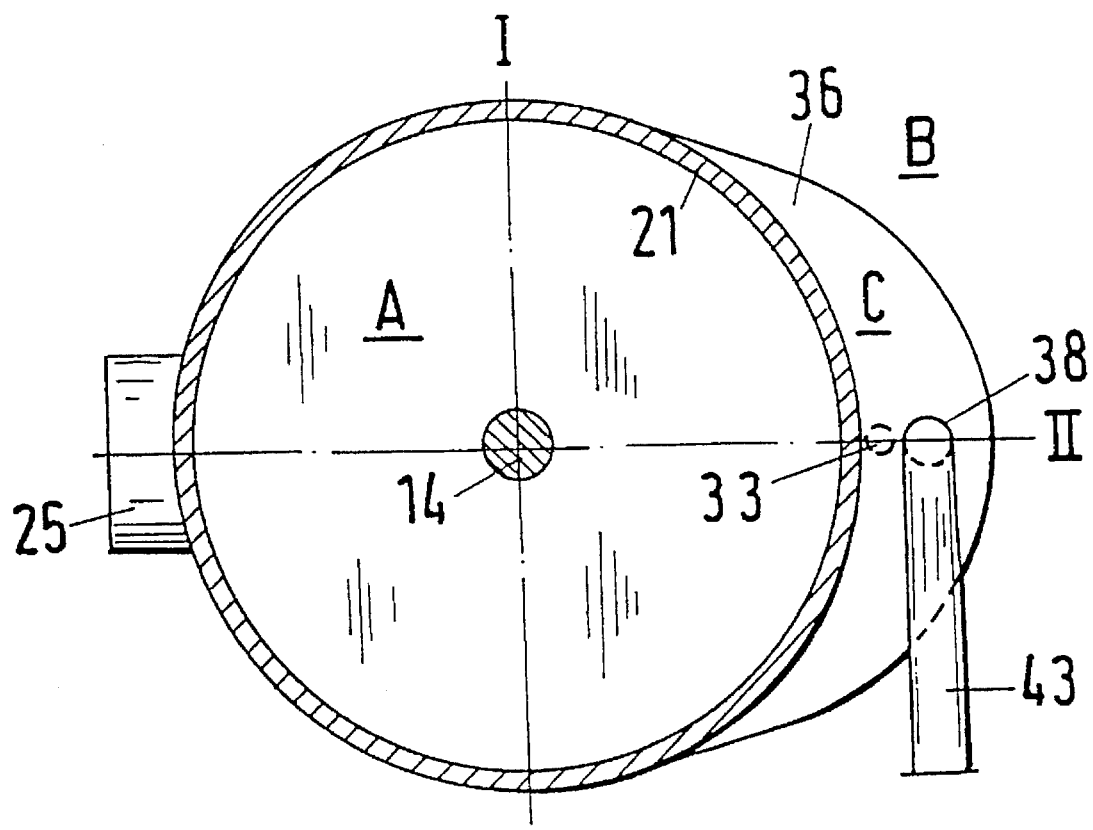
FIG. 2 shows section S—S through the upper portion of the vessel with an exhaust in the region of the bay.

In section S—S, FIG. 2 shows the electrode 14 and the cooling jacket 21 in the region of the upper portion 20 of the vessel. This top view shows a charging door 25 and the bottom tap opening 33 arranged on the longitudinal axis II of the furnace.

The area of the upper portion of the vessel is designated by A and the area of the lower portion of the vessel is designated by B, the difference between the two being designated as annular partial surface C. The annular partial surface C of the duct 16 is provided with the duct covering 36 to which the connection line 38 is connected. The connection line 38 opens into connecting line 43, a part of the exhaust device 40 which is not shown in more detail.

Figure 3:
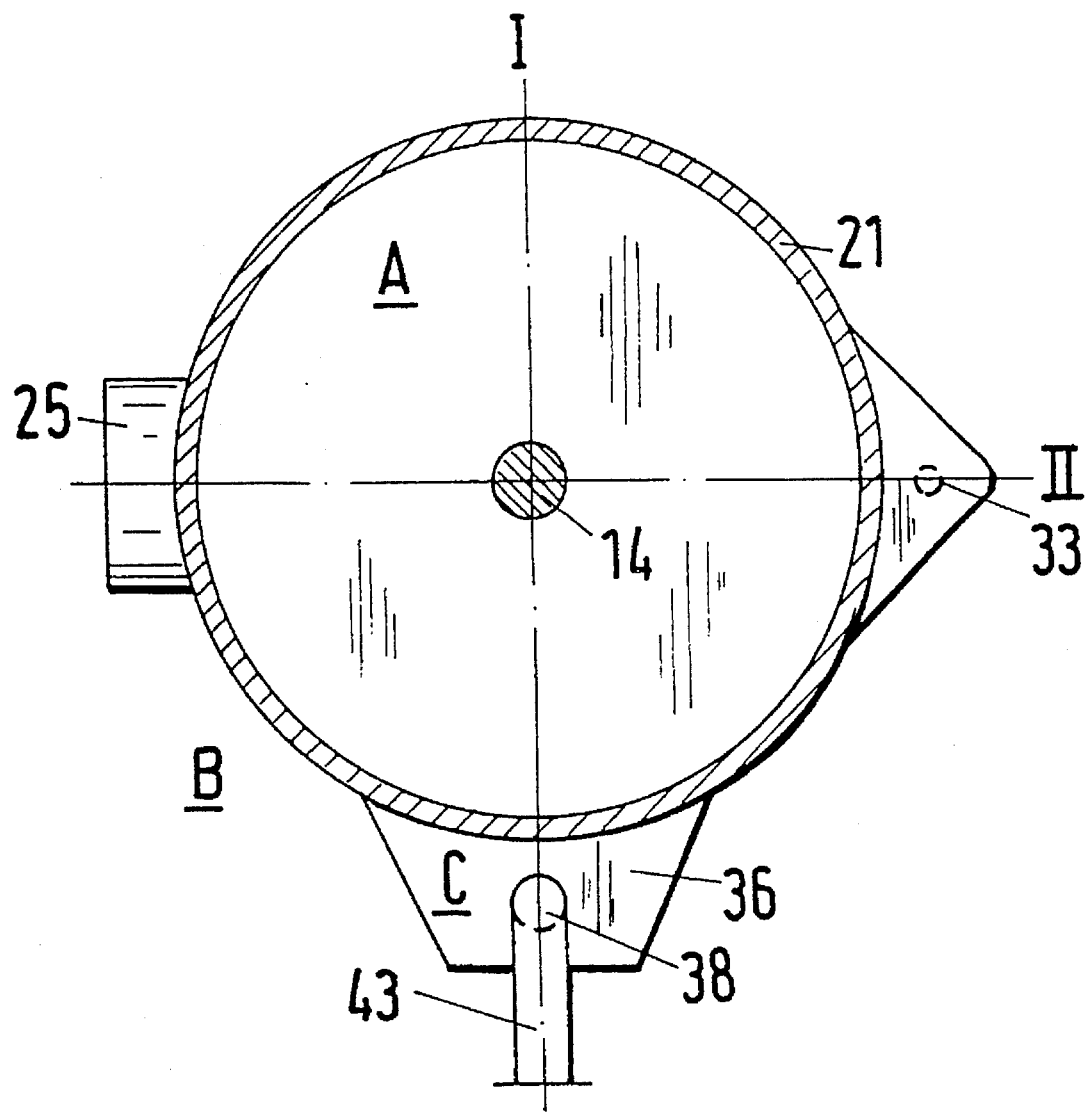
FIG. 3 shows section S—S through an upper part of the vessel with an exhaust in the region of the furnace tilt axis.

FIG. 3 shows a furnace vessel using the same reference numbers as FIG. 2. The furnace vessel has a projection with annular partial surface C which is provided with a coveting 36 to which the connection line 38 and, in the continuing portion, the connecting line 43 are connected. In the furnace shown in FIG. 3, the annular partial surface C is arranged in the region of the tilt axis I of the furnace.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. A process for the treatment of at least one of gases, dust and vapors present and occurring in a furnace vessel of a closed arc furnace which furnace vessel defines an upper portion and a lower portion and contains a charge column, a metal melt and slag being disposed in the lower portion of the furnace vessel, said process comprising the steps of:
   (a) smelting the charge column, metal melt and the slag contained in the furnace vessel whereby the at least one of gases, dust and vapors is generated;
   (b) guiding the at least one of gases, dust and vapors in a direction opposite a naturally occurring flow direction through the charge column in the furnace vessel during said smelting step;
   (c) bringing the at least one of gases, dust and vapors into contact with the melt and the slag after step (b); and
   (d) removing the at least one of gases, dust and vapors from the arc furnace in a region between the upper and lower portions of the furnace vessel.

2. A process according to claim 1, wherein said charge column comprises scrap.

3. A process according to claim 1, wherein a main feed air is fed to be uniformly distributed and adjustable with respect to a quantity at an edge of the upper portion of the furnace vessel.

4. A process according to claim 3, wherein additional gases are introduced above the charge column in the upper portion of the furnace vessel.

5. A process according to claim 4 wherein an exhaust air exits the arc furnace in a horizontal plane, to be variable in quantity.

6. A process according to claim 1, wherein an exhaust air leaves the arc furnace in a horizontal plane to be variable in quantity.

7. An arc furnace for melting metal, comprising:
   a furnace vessel for smelting a charge column, metal melt and slag, said furnace vessel having an upper portion and a lower portion, the charge column, the melt and the slag being disposed in the lower portion, at least one of gases, dust and vapors being generated in the furnace vessel by the smelting;
   a cover operably connected to said upper portion for covering said furnace vessel; and exhaust means in communication with said lower portion of said furnace vessel for guiding the at least one of gases, dust and vapors generated during smelting in said furnace vessel in a direction opposite to a naturally occurring flow direction through the charge column for bringing the at least one of the gases, dust and vapors into contact with the melt and the slag after leaving the charge column, and for removing the at least one of gases, dust and vapors from the arc furnace vessel in a region between said lower and upper portions of said furnace vessel.

8. An arc furnace according to claim 7, wherein the metal comprises scrap.

9. An arc furnace according to claim 7, further comprising adjusting and throttle members, wherein said exhaust means comprises first, second and third connection lines, one end of each of which being in communication with a separate one of said adjusting and throttle members, second ends of said first and second connection lines each being in communication with said furnace vessel.

10. An arc furnace according to claim 9 further comprising a covering, wherein said upper portion comprises a cooling jacket, wherein said upper portion has a tubular shape having a first predetermined diameter and a first corresponding predetermined cross-sectional area, wherein said lower portion comprises a fireproof lining and has a second predetermined cross-sectional area, wherein said second predetermined cross-sectional area is greater than said first predetermined cross-sectional area, wherein said lower portion comprises an area projecting out from under at least one side of said upper portion having an annular partial surface extending beyond said upper portion, wherein said covering is in communication with said cooling jacket for covering said annular partial surface, wherein said first connection line and said adjusting and throttle member connected to it is in communication with said covering, wherein said second connection line and said adjusting and throttle member connected to it is in communication with said cover.

11. An arc furnace according to claim 10, wherein said cover comprises a dome facing away from said upper portion of said furnace vessel, said second connection line of said exhaust means being connected to said dome.

12. An arc furnace according to claim 10, further comprising a measuring and regulating means for controlling the adjusting and throttle device for selection of said exhaust means to be in communication with one of said lower portion through said first connection line and said upper portion through said second connection line.

13. An arc furnace according to claim 12, wherein a first adjusting and throttle member in communication with said first connection line, a second adjusting and throttle member in communication with said second connection line and a third adjusting and throttle member in communication with said third connection line.

14. An arc furnace according to claim 13, further comprising a gas feed line having a fourth adjusting and throttling member in communication with a gas supplier and said cover of said furnace vessel.

15. An arc furnace according to claim 14, further comprising a feed line having an air fifth adjusting throttle member for adjusting a quantity of feed air to be fed to said third connecting line.

16. An arc furnace according to claim 15, wherein said first, second, third, fourth and fifth adjusting and throttle members are each responsive to said measuring and regulating means for controlling the direction of flow and the volume of the gases, dust and vapors.

17. An arc furnace according to claim 16, further comprising a pressure gauge arranged in an upper region of said ,upper portion of said vessel for measuring the pressure of said vessel, wherein said measuring and regulating means is responsive to said pressure gauge.

18. An arc furnace according to claim 16, further comprising a temperature gauge arranged in communication with said third connection line for measuring the temperature of the gases in said third connecting line, wherein said measuring and regulating means is responsive to said temperature gauge.

19. An arc furnace according to claim 16, further comprising a filter in communication with said third connection line, wherein said temperature gauge is connected to said third connection line between said air feed line and said filter.

20. An arc furnace according to claim 18, wherein baskets for two said upper portion has a predetermined volume.

21. An arc furnace according to claim 19, further comprising at least one auxiliary burner supplied by a secondary energy source, said auxiliary burner being arranged at said upper portion of said furnace vessel.

* * * * *